United States Patent [19]
Newton

[11] Patent Number: 5,860,276
[45] Date of Patent: Jan. 19, 1999

[54] DUCTED FAN GAS TURBINE ENGINE MOUNTING

[75] Inventor: Arnold Newton, Derby, England

[73] Assignee: Rolls-Royce plc, London, England

[21] Appl. No.: 815,455

[22] Filed: Mar. 11, 1997

[30] Foreign Application Priority Data

Apr. 18, 1996 [GB] United Kingdom .................... 9608064

[51] Int. Cl.⁶ ....................................................... F02C 7/20
[52] U.S. Cl. ......................................... 60/226.1; 60/39.31
[58] Field of Search ............................... 60/39.31, 226.1; 244/54, 248

[56] References Cited

U.S. PATENT DOCUMENTS

| | | | |
|---|---|---|---|
| 4,147,029 | 4/1979 | Sargisson | 60/39.31 |
| 4,785,625 | 11/1988 | Stryker et al. | |
| 5,174,525 | 12/1992 | Schilling | 60/39.31 |
| 5,205,513 | 4/1993 | Schilling | |
| 5,452,575 | 9/1995 | Freid | 60/39.31 |
| 5,524,847 | 6/1996 | Brodell et al. | 60/39.31 |

FOREIGN PATENT DOCUMENTS

| | | |
|---|---|---|
| 1 516 980 | 7/1978 | United Kingdom . |
| 2 215 290 | 9/1989 | United Kingdom . |
| 2 275 308 | 8/1994 | United Kingdom . |
| 95/18042 | 7/1995 | WIPO . |

*Primary Examiner*—Louis J. Casaregola
*Attorney, Agent, or Firm*—W. Warren Taltavull; Farkas & Manelli PLLC

[57] ABSTRACT

A ducted fan gas turbine engine is mountable on an aircraft structure via a pylon which includes a yoke. The yoke straddles the compressor module of the engine and is connected thereto at points diametrically opposite each other, thus obviating thrust links and the need for radial struts in the plane of the yoke.

4 Claims, 1 Drawing Sheet

DUCTED FAN GAS TURBINE ENGINE MOUNTING

THE FIELD OF THE INVENTION

The present invention relates to the mounting of a ducted fan gas turbine engine to an aircraft. Specifically, the engine is mounted on a pylon structure which is provided on either the wing or fuselage of the aircraft.

BACKGROUND OF THE INVENTION

It has been the practice to interconnect the ducted fan structure and the core gas generator of a ducted fan gas turbine engine and to further connect each to a common pylon projecting from a wing or fuselage of an associated aircraft. The result was that each unit had to be of sufficiently robust construction to absorb loads imposed upon it by the other, to thereby minimise undesirable relative movements therebetween during operation. The arrangement engendered weight penalties.

Another arrangement is described in U.S. Pat. No. 4,785,625 and comprises forming an axial portion of the core gas generator cowling into an annular member and supporting it via struts from a pylon. Operating loads as well as the weight of the engine are thus transferred via the struts, and the pylon, to associated aircraft structure. Further, the chordal dimensions of the struts and the axial length of the annular cowl portion, are such as to counter turning forces about a fulcrum in the plane of the struts. Again, in the arrangement of 4,785,625 weight is a penalty, along with the complicated remaining structure shown and claimed therein.

The present invention seeks to provide an improved ducted fan gas turbine engine mounting arrangement.

According to the present invention a ducted fan gas turbine engine mounting arrangement comprises a pylon connectable to aircraft structure, said pylon including a yoke to which the compressor module of a core gas generator of the ducted fan gas turbine engine is connected said yoke and said compressor module being in radially spaced apart relationship, interconnection means being provided to interconnect said yoke and said compressor module in a plane containing the longitudinal axis of said engine, such that vertical side and thrust loads exerted by said ducted fan gas turbine engine are transmitted via said interconnection means and pylon, to a said aircraft when the ducted fan gas turbine is operating thereon.

BRIEF DESCRIPTION OF THE DRAWINGS

The invention will now be described by way of example and with reference to the accompanying drawings in which.

DETAILED DESCRIPTION OF THE INVENTION

Figure 1:
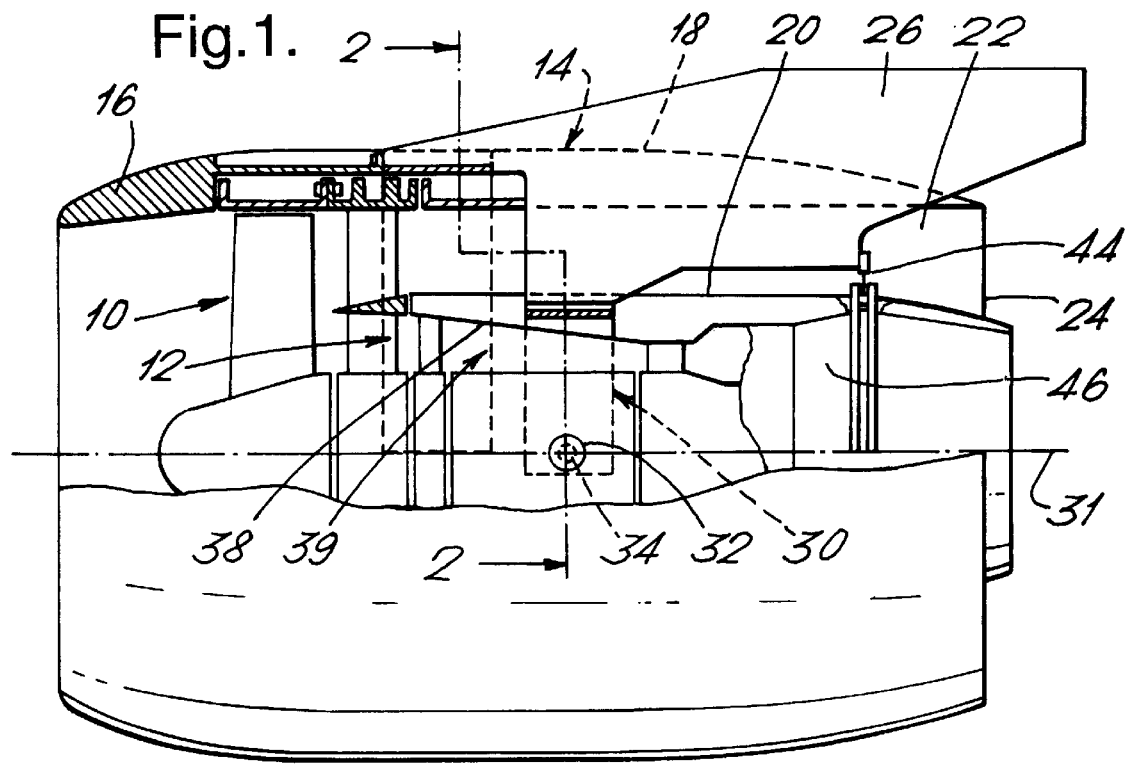
FIG. 1 is a diagrammatic, part-axial cross-sectional view of a ducted fan gas turbine engine in accordance with the present invention.

Referring to FIG. 1 a ducted fan gas turbine engine comprises a fan 10 which is upstream of, and driven by, a core gas generator 12 in known manner. The fan 10 is surrounded by a casing 14 and an air intake structure 16. The latter is extended downstream by further cowling 18 to define, with an outer casing 20 of the core gas generator, a fan duct 22 which terminates in a thrust nozzle 24.

A pylon 26 for attaching the engine to an aircraft (not shown) penetrates the fan duct 22 and a radially inner portion thereof extends laterally in arcuate manner, to form a yoke 30. In the example, the yoke 30 extends around the core gas generator 12 and past a horizontal plane containing the axis 31 of the engine. Recesses 32 are provided in the ends of the yoke 30 for the receipt of the heads of pins 34, which are inserted through holes in the yoke 30, and in bosses 36 (FIG. 2) on the outer surface of the casing 38 of a compressor module 39 of the core gas generator 12. The pins 34 may be retained by any suitable means.

Figure 2:
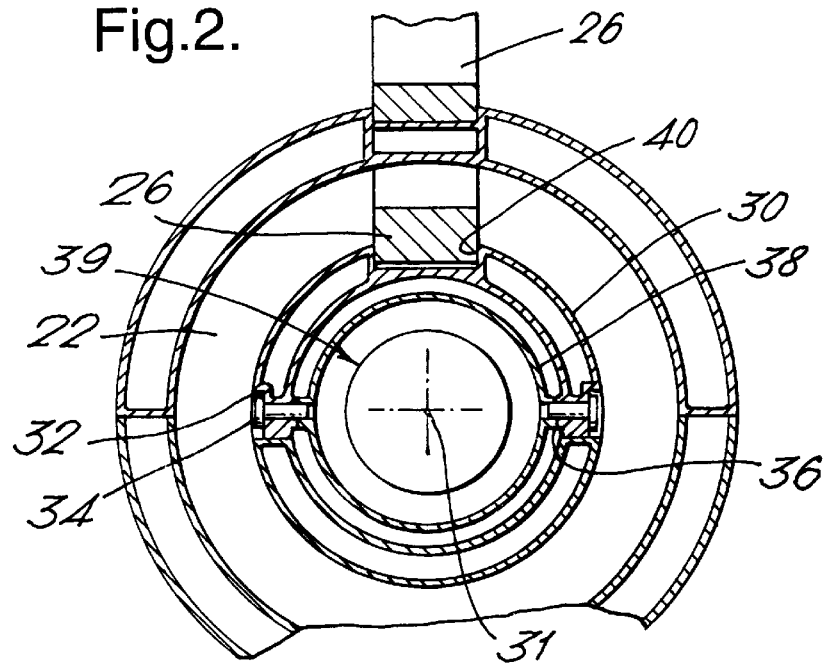
FIG. 2 is a cross sectional, enlarged part view on-line 2—2 in FIG. 1.

Referring to FIG. 2, in this example the yoke 30 is a pre-fabricated structure which has a slot 40 at its top into which the inner end of the pylon 26 fits. The yoke 30 is fastened to the pylon 26 by set screws (not shown) although other suitable means may be employed if so desired. Access panels (not shown) may be provided in the yoke 30, to enable insertion and removal of the fastening means (not shown).

The yoke 30 is so configured as to define a portion of the outer surface of the core gas generator casing 20 and therefore, the inner flow surface of the fan duct 22.

The provision of the yoke 30 for supporting the core gas generator 12 ensures that vertical, side and thrust loads are transmitted via the yoke 30 and the pylon 26 to the aircraft carrying the engine. It obviates the need for radial struts across the fan duct 22, which is thus substantially clear of obstructions, other than that caused by the pylon 26. Further, thrust links which normally connect between the core gas generator 12 and pylon when radial struts are not utilised are also obviated, again reducing obstructions. However, suspension links 44 connecting the turbine casing 46 with the pylon 26 in known manner would still be utilised.

I claim:

1. A ducted fan gas turbine engine mounting arrangement comprising a pylon connectable to aircraft structure, said pylon including a yoke to which the compressor module of a core gas generator of the ducted fan gas turbine engine is connected and which is supported by said yoke, said yoke and said compressor module being in radially spaced apart relationship, interconnection means being provided to interconnect said yoke and said compressor module in a plane containing the longitudinal axis of said engine such that vertical, side and thrust loads are transmitted via said interconnection means and pylon, to a said aircraft when the ducted fan gas turbine engine is operating thereon.

2. An engine mounting arrangement as claimed in claim 1 wherein the yoke is detachably attached to the pylon.

3. An engine mounting arrangement as claimed in claim 1 wherein the yoke forms a portion of the outer surface of the core gas generator casing and therefore a portion of the axial flow surface of the fan duct.

4. An engine mounting arrangement as claimed in claim 3 wherein the core gas generator is further connected to the pylon via links which extend therebetween in the region of the turbine module of the core gas generator.

* * * * *